US011576296B2

(12) United States Patent
Priepke et al.

(10) Patent No.: US 11,576,296 B2
(45) Date of Patent: Feb. 14, 2023

(54) AGRICULTURAL MOWING SYSTEM WITH OVERLAP CONTROL

(71) Applicant: CNH Industrial America LLC, New Holland, PA (US)

(72) Inventors: Edward H. Priepke, Lancaster, PA (US); John H. Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 613 days.

(21) Appl. No.: 16/674,675

(22) Filed: Nov. 5, 2019

(65) Prior Publication Data

US 2021/0127551 A1      May 6, 2021

(51) Int. Cl.
| | | |
|---|---|---|
| *A01B 69/04* | (2006.01) | |
| *A01D 34/66* | (2006.01) | |
| *A01D 34/00* | (2006.01) | |
| *A01D 101/00* | (2006.01) | |

(52) U.S. Cl.
CPC .......... *A01B 69/008* (2013.01); *A01D 34/008* (2013.01); *A01D 34/66* (2013.01); *A01D 2101/00* (2013.01)

(58) Field of Classification Search
CPC .... A01B 69/008; A01D 34/008; A01D 34/66; A01D 34/667; A01D 2101/00
See application file for complete search history.

(56) References Cited

U.S. PATENT DOCUMENTS

| | | | |
|---|---|---|---|
| 1,044,744 A | 11/1912 | Caswell et al. | |
| 1,297,628 A | 3/1919 | Wodham | |
| 1,939,830 A | 12/1933 | Paul | |
| 2,203,981 A | 6/1940 | Coultas | |
| 2,370,468 A | 2/1945 | Hyland | |
| 2,552,770 A | 5/1951 | D'Artenay | |
| 4,304,086 A | 12/1981 | Stuchl | |
| 4,344,639 A | 8/1982 | Pollard | |
| 4,478,026 A | 10/1984 | Mullet et al. | |
| 4,662,161 A | 5/1987 | Patterson | |

(Continued)

FOREIGN PATENT DOCUMENTS

| | | | | |
|---|---|---|---|---|
| BE | 1024801 B1 | * | 7/2018 | ............. A01B 69/00 |
| DE | 102006034562 A1 | * | 2/2008 | ........... A01B 59/042 |

(Continued)

*Primary Examiner* — Michael J Zanelli
(74) *Attorney, Agent, or Firm* — Peter Zacharias; Patrick Sheldrake

(57) ABSTRACT

An agricultural mowing system includes: a driving vehicle having a steerable axle and a pivotable tongue and defining a travel axis; a first mower coupled to the driving vehicle; a second mower coupled to the tongue; a tongue actuator configured to pivot the tongue; a tongue angle sensor configured to output signals corresponding to a tongue angle of the tongue; and a controller operatively coupled to the tongue actuator and the tongue angle sensor. The controller is configured to: determine a lateral overlap or underlap of the mowers exceeds a threshold value based at least partially on the tongue angle and a steering angle of the steerable axle; determine a correction angle needed for the tongue to pivot such that the lateral overlap or underlap no longer exceeds the threshold value; and output a correction signal to the tongue actuator to pivot the tongue by the correction angle.

15 Claims, 3 Drawing Sheets

(56) References Cited

U.S. PATENT DOCUMENTS

| | | | |
|---|---|---|---|
| 5,412,929 A | 5/1995 | Urbain et al. | |
| 6,804,597 B1 * | 10/2004 | Posselius | A01B 79/005 |
| | | | 701/50 |
| 2006/0174599 A1 | 8/2006 | Hironimus | |
| 2006/0191250 A1 | 8/2006 | Neuerburg et al. | |
| 2014/0083071 A1 * | 3/2014 | Fay, II | A01D 45/00 |
| | | | 56/14.7 |
| 2020/0247196 A1 * | 8/2020 | Guiet | B60D 1/44 |

FOREIGN PATENT DOCUMENTS

| | | | | |
|---|---|---|---|---|
| DE | 102007034166 A1 * | 1/2009 | | A01B 69/006 |
| EP | 1 321 027 A1 | 6/2003 | | |
| EP | 1321027 A1 * | 6/2003 | | A01D 75/30 |
| FR | 2904182 A1 * | 2/2008 | | A01B 59/042 |

* cited by examiner

AGRICULTURAL MOWING SYSTEM WITH OVERLAP CONTROL

FIELD OF THE INVENTION

The present invention pertains to agricultural vehicles and, more specifically, to agricultural mowers and mower conditioners.

BACKGROUND OF THE INVENTION

Mowers and mower-conditioners are often employed to cut hay and/or other standing plants, such as grass, in a field. For cutting large fields, many mowing systems include a driving vehicle that pushes a mower (or mower-conditioner) in front of the vehicle while simultaneously pulling another mower (or mower-condition) behind the vehicle.

It is known that a slight lateral overlap is desired between the front mower and the rear mower to ensure that all of the standing plants are cut and no patches of uncut plants are left behind in a pass, which results due to lateral "underlap". Various mechanisms are known for adjusting the lateral overlap between the front and rear mowers, but such solutions can be overly complex and unreliable.

What is needed in the art is an agricultural mowing system that can address some of the previously described issues with known systems.

SUMMARY OF THE INVENTION

Exemplary embodiments disclosed herein provide an agricultural mowing system with a controller that can cause a tongue actuator to pivot a mower responsively to the controller determining that a lateral overlap or underlap exceeds a threshold value.

In some exemplary embodiments provided according to the present disclosure, an agricultural mowing system includes: a driving vehicle having a chassis, a steerable axle carried by the chassis, and a tongue coupler carried by the chassis, the driving vehicle defining a travel axis; a first mower having a plurality of first cutting elements and coupled to the driving vehicle; a second mower having a plurality of second cutting elements and a pivotable tongue coupled to the tongue coupler; a tongue actuator associated with the tongue and configured to pivot the tongue; a tongue angle sensor associated with the tongue and configured to output tongue angle signals corresponding to a tongue angle of the tongue relative to the travel axis; and a controller operatively coupled to the tongue actuator and the tongue angle sensor. The controller is configured to: determine a lateral overlap or underlap of the first mower and the second mower, relative to the travel axis, exceeds a threshold value based at least partially on the tongue angle and a steering angle of the steerable axle; determine a correction angle needed for the tongue to pivot such that the lateral overlap or underlap no longer exceeds the threshold value; and output a correction signal to the tongue actuator to cause the tongue actuator to pivot the tongue by the correction angle.

In some exemplary embodiments, a method of controlling an agricultural mowing system is provided. The agricultural mowing system includes a driving vehicle having a steerable axle and a tongue coupler, a first mower coupled to the driving vehicle, and a second mower including a pivotable tongue coupled to the tongue coupler. The method is performed by a controller and includes: determining a lateral overlap or underlap of the first mower and the second mower, relative to a travel axis of the driving vehicle, exceeds a threshold value based at least partially on a tongue angle of the tongue and a steering angle of the steerable axle; determining a correction angle needed for the tongue to pivot such that the lateral overlap or underlap no longer exceeds the threshold value; and outputting a correction signal to a tongue actuator to pivot the tongue by the correction angle.

One possible advantage that may be realized by exemplary embodiments disclosed herein is that the controller can determine that the lateral overlap or underlap exceeds the threshold value by utilizing known geometry of the vehicle and the mowers and cause the tongue actuator to adjust the tongue so the overlap or underlap no longer exceeds the threshold value.

Another possible advantage that may be realized by exemplary embodiments disclosed herein is that tongue can be adjusted using fewer inputs to the controller than known systems, which can significantly reduce the system complexity and computing power necessary to control the tongue.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
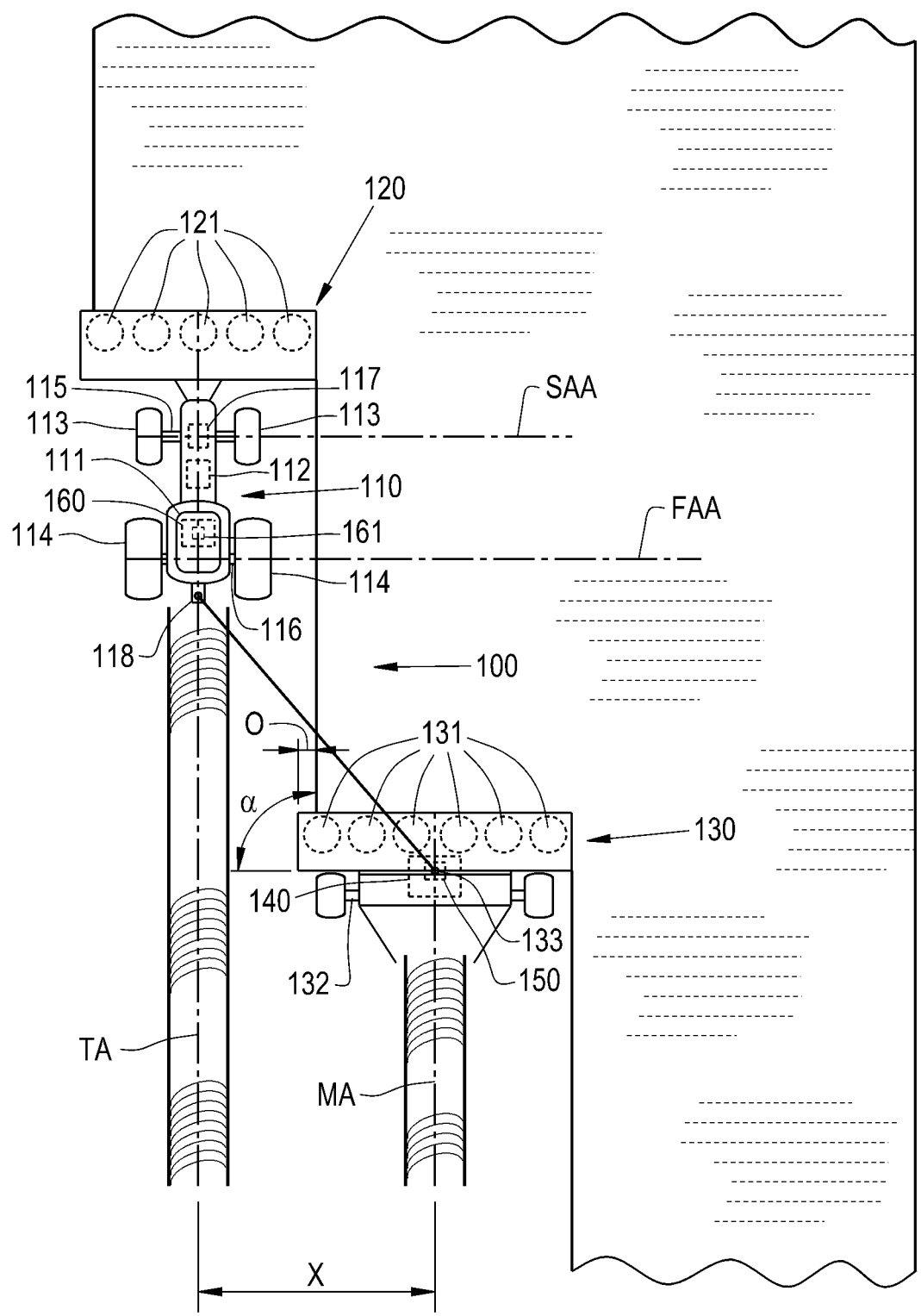
FIG. 1 illustrates a schematic view of an exemplary embodiment of an agricultural mowing system traveling along a straight path, provided in accordance with the present disclosure.

Referring now to the drawings, and more particularly to FIG. 1, an exemplary embodiment of an agricultural mowing system 100 provided according to the present disclosure is illustrated. The mowing system 100 includes a driving vehicle 110, a first mower 120 coupled to the driving vehicle 110, and a second mower 130 coupled to the driving vehicle 110. In other words, the mowing system 100 is a tandem mowing system that includes at least two mowers 120, 130 operating in tandem to cut plants from a field. It should be appreciated that while only two mowers 120, 130 are illustrated and described herein, the present disclosure is equally applicable to mowing systems that incorporate more than two mowers, such as mowing systems that include three or more mowers.

The driving vehicle 110 includes a chassis 111 and a power source, such as an internal combustion engine (ICE) 112, to provide motive force to a plurality of wheels 113, 114. Some of the wheels, such as front wheels 113, may be coupled to the chassis 111 by a steerable front axle 115 while the rear wheels 114 are coupled to the chassis 111 by a fixed rear axle 116. It should be appreciated that, alternatively, the front axle 115 may be a fixed axle and/or the rear axle 116 may be a steerable axle. In some embodiments, a steering angle sensor 117 is associated with the steerable axle 115 and configured to output a steering angle signal that corresponds to a steering angle of the steerable axle 115, as will be described further herein. The chassis 111 also carries a tongue coupler 118 that allows coupling of the second mower 130 to the driving vehicle 110, as will be described further herein. As illustrated, the driving vehicle 110 is in the form of a tractor, but it should be appreciated that the driving vehicle 110 may be other types of vehicles.

The first mower 120 and the second mower 130 each carry a respective set of cutting elements 121, 131 that can cut standing plants as the mowers 120, 130 travel across the field. The mowers 120, 130 are each coupled to the driving vehicle 110. The first mower 120, for example, may be center mounted to the driving vehicle 110 in a "fixed" manner so the first mower 120 is generally static relative to the driving vehicle 110. The second mower 130, on the other hand, is coupled to the tongue coupler 118 by a pivotable tongue 133 that can change the angular position of the second mower 130 relative to a travel axis TA defined by the driving vehicle 110, which generally corresponds to a travel direction of the driving vehicle 110. In this sense, the first mower 120 can be in-line with the travel axis TA so the first mower 120 is generally co-axial with the travel axis TA. The second mower 130, on the other hand, can be angled and laterally offset from the travel axis TA and the first mower 120 by pivoting the tongue 133. A lateral offset X of the second mower 130, relative to the travel axis TA and the first mower 120, can be defined between a mower axis MA of the second mower 130 and the travel axis TA.

A tongue actuator 140 is associated with the tongue 133 and configured to pivot the tongue 133. As used herein, the tongue actuator 140 is "associated" with the tongue 133 in the sense that the tongue actuator 140 is somehow connected, either directly or indirectly, to the tongue 133 in a manner that allows actuating movement of the tongue actuator 140 to pivot the tongue 133. The tongue actuator 140 may be, for example, a hydraulic actuator in the form of a cylinder that is powered by a hydraulic system of the driving vehicle 110. In some embodiments, the tongue actuator 140 is also carried by the second mower 130. It should be appreciated that the tongue actuator 140 can also be carried by the tractor 110 to pivot the tongue 133.

A tongue angle sensor 150 is associated with the tongue 133 and configured to output tongue angle sensors corresponding to a tongue angle α relative to the travel axis TA. The tongue angle sensor 150 may be, for example, a rotary sensor that is carried by the second mower 130 adjacent to the tongue 133 to sense the tongue angle α and/or may be mounted at the tongue coupler 118 of the driving vehicle 110. Alternatively, the tongue angle sensor 150 may be part of the tongue actuator 140; in such a case, the tongue actuator 140 may be a "smart" actuator that may include absolute positioning features that translate extension/retraction directly to the tongue angle α relative to the travel axis TA. In other words, in some embodiments the tongue actuator 140 may also function as the tongue angle sensor 150. Many different types of angle sensors are known, so further description is omitted for brevity.

A controller 160, such as a tractor controller, is operatively coupled to the tongue actuator 140 and the tongue angle sensor 150 to communicate via electronic signals. The controller 160 may be, for example, a central tractor controller that is configured to control a variety of tractor functions. Alternatively, the controller 160 may be an application specific controller that is specifically configured to control the orientation of the second mower 130 relative to the driving vehicle 110 by causing the tongue actuator 140 to pivot the tongue 133.

As illustrated in FIG. 1, the first mower 120 travels in front of the driving vehicle 110 and the second mower 130 travels behind the driving vehicle 110. Due to the orientation of the mowers 120, 130, the mowers 120, 130 are overlapped with one another laterally, relative to the travel axis TA, as designated by the illustration of a lateral overlap O. Lateral overlapping of the mowers 120, 130 significantly reduces the possibility of standing plants being left on the field in areas that the mowers 120, 130 have traveled across. Overlapping the mowers 120, 130 also eliminates so-called lateral underlap between the mowers 120, 130, which would leave behind areas of standing plants due to the mowers 120, 130 not traversing the underlapped area. It should be appreciated that "overlap" and "underlap" described herein refers to lateral overlap or underlap relative to the travel axis TA and, as used herein, "lateral" refers to the direction of an axis that extends orthogonally relative to the travel axis TA.

In known mowing systems, the overlap and underlap of the tandem mowers can be controlled manually or automatically. In manual control, an operator may look over his or her shoulder and manually adjust the tongue actuator to increase or reduce the amount of overlap. Such manual adjustment is not generally consistent or accurate and is tiresome for the operator. Automatic control may be based on, for example, global positioning satellite (GPS) coordinates of each of the mowers. While this is an effective way to control the overlap and underlap, several issues have been found with such systems. One particular issue that has been found is the overall complexity of the control system significantly increases when utilizing GPS coordinates, because each mower must be equipped with a GPS transponder and associated wiring and controls for the transponders. This increased complexity also increases the computing power that is required to control the overlap and underlap, which leaves less computing power available for other functions of the tractor. Further, utilizing GPS coordinates to control the overlap and underlap necessarily results in substantial adjustment delays, relative to real-time, due to travel time between the transponders and orbiting satellite(s), which can result in fairly large areas of underlap developing as the mowers travel at faster speeds.

Figure 2:
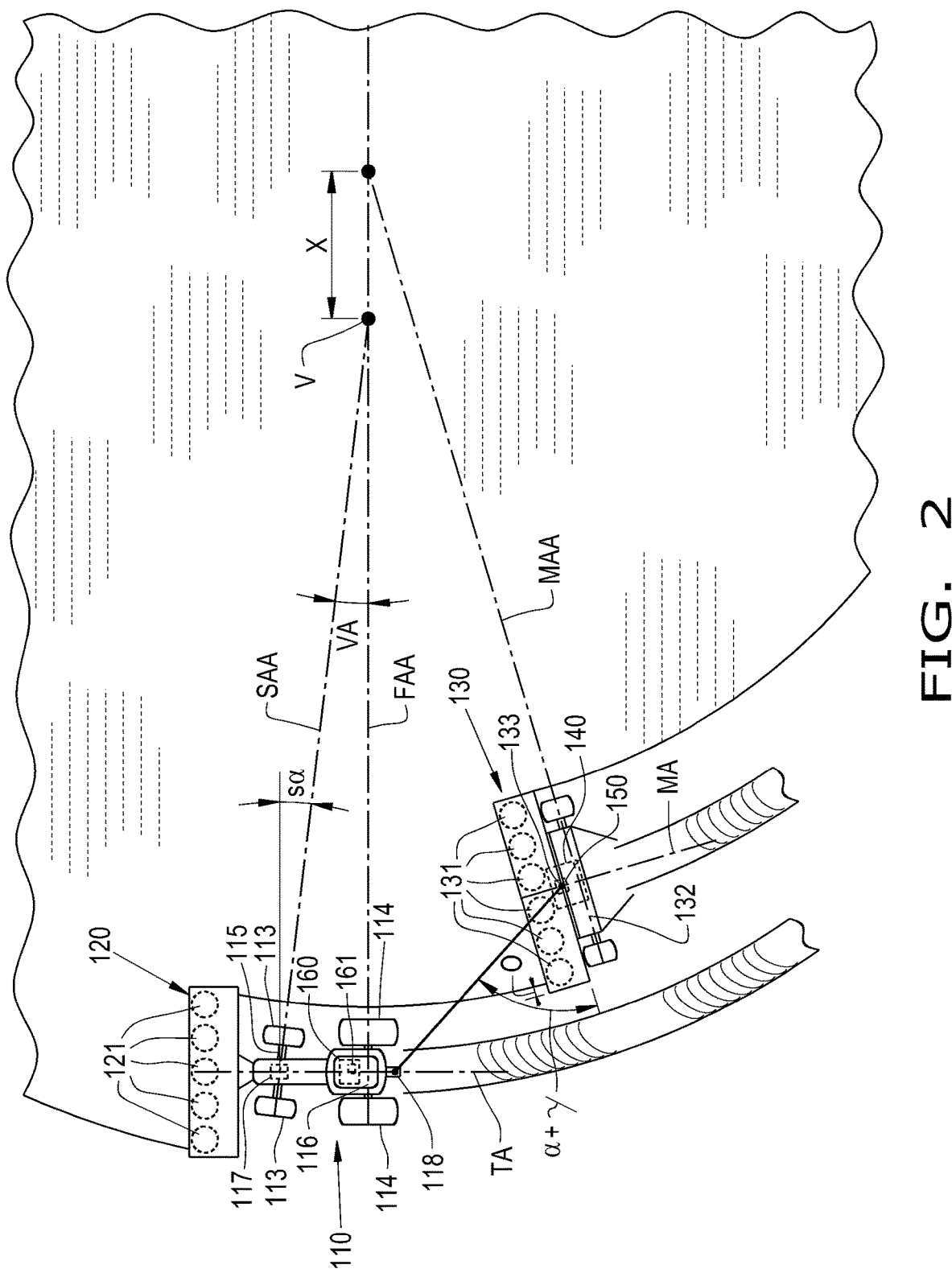
FIG. 2 illustrates agricultural mowing system of FIG. 1 during a turn.

To address some of the previously described issues, and referring now to FIG. 2 as well, the controller 160 is configured to determine a lateral overlap O or underlap of the first mower 120 and the second mower 130, relative to the travel axis TA, exceeds a threshold value based at least partially on a steering angle Sα of the steerable axle 115 and the tongue angle α, determine a correction angle γ needed for the tongue 133 to pivot such that the lateral overlap O or underlap no longer exceeds the threshold value, and output a correction signal to the tongue actuator 140 to cause the tongue actuator 140 to pivot the tongue 133 by the correction angle γ. The controller 160 may determine the steering angle Sα, for example, based on signals output by the steering angle sensor 117. The controller 160 may have a memory 161 that stores an algorithm for determining the correction angle γ that is needed to correct the overlap O or underlap based on the tongue angle α and the steering angle Sα. The algorithm may be derived from the geometric relationship between elements of the mowing system 100, such as the driving vehicle 110, the mowers 120, 130, and the tongue 133 coupling the second mower 130 to the driving vehicle 110. In some embodiments, the controller 160 is configured to set a fixed relationship between the tongue angle α and the steering angle Sα, based on the algorithm, and determine the correction angle γ by determining an adjustment angle, i.e., an angle of adjustment, that is needed to maintain the fixed relationship between the tongue angle α and the steering angle Sα. It should be appreciated that many different types of algorithms may be used to determine the correction angle γ, depending on the geometry of the components of the mowing system 100.

The threshold value for the lateral overlap O or underlap may be adjusted to many different values. In some embodiments, the threshold value for underlap is, for example, 1 cm while the threshold value for overlap is, for example, 5-10 cm. Due to any underlap resulting in standing plants being missed by the mowers 120, 130, the threshold value for underlap may be significantly smaller than the threshold value for overlap. In some embodiments, the threshold value for underlap is zero so that any determined underlap (subject to sensitivity of the measurement) causes the controller 160 to determine the correction angle γ and output the correction signal. The threshold value for overlap or underlap may be set by an operator manually or be an automatic preset value stored in the memory 161 of the controller 160.

In some embodiments, the controller 160 is configured to determine the lateral overlap O or underlap exceeds the value at least partially by determining the lateral offset X between the driving vehicle 110 and the second mower 130. As illustrated in FIG. 1, the lateral offset X between the travel axis TA of the driving vehicle 110/first mower 120 and the mowing axis MA of the second mower 130 provides a relative distance between edges of the mowers 120, 130. Using the known relationship between an edge of each mower 120, 130 to its respective axis TA, MA and the lateral offset X, the controller 160 can determine the lateral overlap O or underlap. The lateral offset X may be determined, for example, from the tongue angle α and the steering angle Sα.

Referring specifically now to FIG. 2, the steerable axle 115 defines a steerable axle axis SAA and the fixed axle 116 defines a fixed axle axis FAA, with a vehicle axle angle VA being defined between the steerable axle axis SAA and the fixed axle axis FAA. Similarly, the second mower 130 may include a mower axle 132 defining a mower axle axis MAA. In some embodiments, the controller 160 is configured to determine the lateral offset X during a turning maneuver by determining a lateral distance between a vertex V of the vehicle axle angle VA and the mower axle axis MAA. From this determined lateral offset X, the controller 160 can then determine the correction angle γ, as previously described.

It should be appreciated that while the previous description refers to determining the correction angle γ based at least partially on the steering angle Sα derived from signals output by the steering angle sensor 117, the controller 160 can also be configured to determine the steering angle Sα in other ways. For example, in some embodiments the controller 160 is operatively coupled to a steering device, which may be controlled by the controller 160, that is coupled to the steerable axle 115 and configured to adjust the steerable axle 115 to turn the driving vehicle 110. Such devices are known, so further description is omitted for brevity. The controller 160 may be configured to follow a stored travel path, such as swath lines, and output steering signals to the steering device to cause the driving vehicle 110 to travel along the swath lines. The output steering signals may thus correspond to the steering angle Sα. In some embodiments, the controller 160 is configured to determine a turning maneuver is about to take place and determine a preemptive correction angle that will be needed to keep the lateral overlap O or underlap from exceeding the threshold value during the turning maneuver. In such an embodiment, the controller 160 can output a preemptive correction signal to the tongue actuator 140 that prepares the tongue actuator 140 to pivot the tongue 133 during the turning maneuver by, e.g., supplying pressurized fluid to the tongue actuator 140. The preemptive correction signal can thus reduce the risk of delay occurring in keeping the lateral overlap O or underlap below the threshold value during a turning maneuver.

From the foregoing, it should be appreciated that the mowing system 100 provided according to the present disclosure includes a controller 160 that can control the lateral overlap O or underlap by determining a correction angle γ based on known vehicle geometry, which remains static, as well as the tongue angle α and the steering angle Sα, which are variable. Generally, the steering angle Sα is controlled to move the mowing system 100 in the proper direction, so the controller 160 can determine the correction angle γ for adjusting the tongue angle α so the mowers 120, 130 maintain the proper amount of overlap and underlap. Unlike manual operation or known systems, which can rely on complicated GPS or crop sensor systems, the controller 160 provided according to the present disclosure only needs to know the tongue angle α and the steering angle Sα to determine the correction angle γ and keep the lateral overlap and underlap within the correct operating ranges. Such control represents an elegant solution that reduces the complexity of the system, and the associated costs and computing requirements, and is responsive in real-time to reduce the risk of excessive lateral overlap or underlap developing between the mowers 120, 130.

Figure 3:
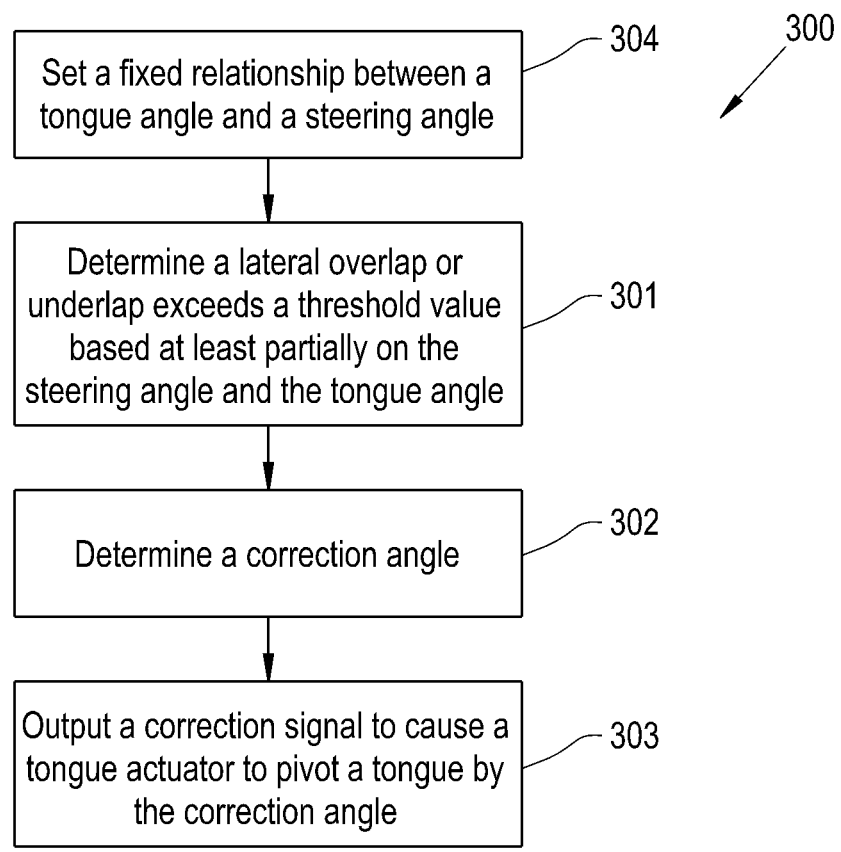
FIG. 3 is a flow chart illustrating an exemplary embodiment of a method of controlling an agricultural mowing system, provided in accordance with the present disclosure.

Referring now to FIG. 3, an exemplary embodiment of a method 300 of controlling an agricultural mowing system 100 is illustrated. The method 300 is performed by a controller 160 and includes determining 301 a lateral overlap O or underlap of a first mower 120 and a second mower 130, relative to a travel axis TA of a coupled driving vehicle 110, exceeds a threshold value based at least partially on a steering angle Sα and a tongue angle α. The steering angle Sα and the tongue angle α may be determined from output signals from respective sensors 117, 150. Upon determining 301 that the lateral overlap O or underlap exceeds the threshold value, a correction angle γ is determined 302, with the correction angle γ corresponding to an angle needed for a pivotable tongue 133 to pivot such that the lateral overlap O or underlap no longer exceeds the threshold value. A correction signal is output 303 to a tongue actuator 140 that causes the tongue actuator 140 to pivot the tongue 133 by the correction angle γ. Pivoting the tongue 133 by the correction angle γ adjusts the relative positioning of the mowers 120, 130 to one another, adjusting the lateral overlap O or underlap.

The first mower 120 may be, for example, pushed in front of the driving vehicle 110 and the second mower 130 may be pulled by the driving vehicle 110 and connected to the tongue 133. The threshold value for the lateral underlap may be 1 cm and the threshold value for the lateral overlap may be 25 cm, as previously described. The tongue actuator 140 and/or the tongue angle sensor 150 may be carried by a chassis 111 of the driving vehicle 110.

In some embodiments, determining 301 the lateral overlap O or underlap exceeds the threshold value includes determining a lateral offset X between the driving vehicle 110 and one of the mowers, such as the second mower 130. The lateral offset X may be determined during a turning maneuver by determining a lateral distance between a vertex V of a vehicle axis VA and a mower axle axis MAA, as previously described.

In some embodiments, the method further includes setting 304 a fixed relationship between the tongue angle α and the steering angle Sα. In such embodiments, determining 302 the correction angle γ can include determining an adjustment angle needed to maintain the fixed relationship between the tongue angle α and the steering angle Sα. It should be appreciated that determining 302 the correction angle γ can also be done in other ways, as previously described.

It is to be understood that the steps of the method 300 are performed by the controller 160 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 160 described herein, such as the method 300, is implemented in software code or instructions which are tangibly stored on a tangible computer readable medium. The controller 160 loads the software code or instructions via a direct interface with the computer readable medium or via a wired and/or wireless network. Upon loading and executing such software code or instructions by the controller 160, the controller 160 may perform any of the functionality of the controller 160 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural mowing system, comprising:
    a driving vehicle comprising a chassis, a steerable axle carried by the chassis, and a tongue coupler carried by the chassis, the driving vehicle defining a travel axis;
    a first mower comprising a plurality of first cutting elements and coupled to the driving vehicle;
    a second mower comprising a plurality of second cutting elements and a pivotable tongue coupled to the tongue coupler;
    a tongue actuator associated with the tongue and configured to pivot the tongue;
    a tongue angle sensor associated with the tongue and configured to output tongue angle signals corresponding to a tongue angle of the tongue relative to the travel axis;
    a controller operatively coupled to the tongue actuator and the tongue angle sensor, the controller being configured to:
        determine a lateral overlap or underlap of the first mower and the second mower, relative to the travel axis and based at least partially on the tongue angle and a steering angle of the steerable axle, exceeds a threshold value;
        determine a correction angle needed for the tongue to pivot such that the lateral overlap or underlap no longer exceeds the threshold value; and
        output a correction signal to the tongue actuator to cause the tongue actuator to pivot the tongue by the correction angle; and
    a steering angle sensor associated with the steerable axis and operatively coupled to the controller, the steering angle sensor being configured to output a steering angle signal corresponding to the steering angle of the steerable axle.

2. The agricultural mowing system of claim 1, wherein the controller is configured to set a fixed relationship between the tongue angle and the steering angle and determine the correction angle by determining an adjustment angle needed to maintain the fixed relationship.

3. The agricultural mowing system of claim 1, wherein the threshold value for underlap is 1 cm and the threshold value for overlap is between 5 cm and 10 cm.

4. The agricultural mowing system of claim 1, wherein the controller is configured to determine the lateral overlap or underlap exceeds the threshold value at least partially by determining a lateral offset between the driving vehicle and the second mower.

5. The agricultural mowing system of claim 4, wherein the driving vehicle comprises a fixed axle defining a fixed axle axis and the steerable axle defines a steerable axle axis, the steerable axle axis and the fixed axle axis defining a vehicle axle angle therebetween, the second mower comprising a mower axle defining a mower axle axis, the controller being configured to determine the lateral offset during a turning maneuver by determining a lateral distance between a vertex of the vehicle axle angle and the mower axle axis.

6. The agricultural mowing system of claim 1, wherein the first mower is pushed in front of the driving vehicle and the second mower is pulled behind the driving vehicle.

7. The agricultural mowing system of claim 1, wherein at least one of the tongue actuator or the tongue angle sensor is carried by the second mower.

8. A method of controlling an agricultural mowing system, the agricultural mowing system comprising a driving vehicle comprising a steerable axle and a tongue coupler, a first mower coupled to the driving vehicle, and a second mower comprising a pivotable tongue coupled to the tongue coupler, the method being performed by a controller and comprising:
    determining a lateral overlap or underlap of the first mower and the second mower, relative to a travel axis of the driving vehicle and based at least partially on a tongue angle of the tongue and a steering angle of the steerable axle, exceeds a threshold value;
    determining a correction angle needed for the tongue to pivot such that the lateral overlap or underlap no longer exceeds the threshold value; and
    outputting a correction signal to a tongue actuator to pivot the tongue by the correction angle.

9. The method of claim 8, further comprising setting a fixed relationship between the tongue angle and the steering angle, wherein determining the correction angle comprises determining an adjustment angle needed to maintain the fixed relationship.

10. The method of claim 8, wherein the threshold value for underlap is 1 cm and the threshold value for overlap is between 5 cm and 10 cm.

11. The method of claim 8, wherein determining the lateral overlap or underlap exceeds the threshold value comprises determining a lateral offset between the driving vehicle and the second mower.

12. The method of claim 11, wherein the driving vehicle comprises a fixed axle defining a fixed axle axis and the steerable axle defines a steerable axle axis, the steerable axle axis and the fixed axle axis defining a vehicle axle angle therebetween, the second mower comprising a mower axle defining a mower axle axis, wherein determining the lateral offset during a turning maneuver comprises determining a lateral distance between a vertex of the vehicle axle angle and the mower axle axis.

13. The method of claim 8, wherein the mowing system comprises a steering angle sensor associated with the steerable axis and operatively coupled to the controller, the steering angle sensor being configured to output a steering angle signal corresponding to the steering angle of the steerable axle.

14. The method of claim 8, wherein the first mower is pushed in front of the driving vehicle and the second mower is pulled behind the driving vehicle.

15. The method of claim 8, wherein at least one of the tongue actuator or the tongue angle sensor is carried by the second mower.

\* \* \* \* \*